US007153557B2

(12) United States Patent
Rancien

(10) Patent No.: US 7,153,557 B2
(45) Date of Patent: Dec. 26, 2006

(54) SECURITY DOCUMENT WITH MARKER

(75) Inventor: Sandrine Rancien, La Murette (FR)

(73) Assignee: Arjowiggins Security, Issy les Moulineaux (FR)

( * ) Notice: Subject to any disclaimer, the term of this patent is extended or adjusted under 35 U.S.C. 154(b) by 0 days.

(21) Appl. No.: 10/510,129

(22) PCT Filed: Apr. 3, 2003

(86) PCT No.: PCT/FR03/01052

§ 371 (c)(1),
(2), (4) Date: Oct. 4, 2004

(87) PCT Pub. No.: WO03/082600

PCT Pub. Date: Oct. 9, 2003

(65) Prior Publication Data

US 2005/0181166 A1 Aug. 18, 2005

(30) Foreign Application Priority Data

Apr. 3, 2002 (FR) .................................. 02 04121

(51) Int. Cl.
*B32B 33/00* (2006.01)
*B32B 9/00* (2006.01)

(52) U.S. Cl. .................. 428/40.2; 428/41.5; 428/42.1; 428/915; 428/916; 235/487; 235/488; 283/72; 283/81; 283/82; 283/94; 283/101

(58) Field of Classification Search ................ 235/487, 235/488; 428/40.2, 41.5, 42.1, 915, 916; 283/72, 81, 82, 94, 101
See application file for complete search history.

(56) References Cited

U.S. PATENT DOCUMENTS

| | | | | |
|---|---|---|---|---|
| 4,686,154 | A * | 8/1987 | Mejia | 428/830 |
| 5,869,160 | A * | 2/1999 | Mason et al. | 428/40.2 |
| 6,354,104 | B1 * | 3/2002 | Feagin | 62/457.1 |
| 6,592,972 | B1 * | 7/2003 | Trantoul | 428/198 |
| 6,701,304 | B1 * | 3/2004 | Leon | 705/401 |
| 6,970,236 | B1 * | 11/2005 | Markantes et al. | 356/71 |
| 2005/0255599 | A1 * | 11/2005 | Wang et al. | 436/56 |
| 2006/0014045 | A1 * | 1/2006 | Einhorn et al. | 428/690 |

FOREIGN PATENT DOCUMENTS

| | | |
|---|---|---|
| FR | 2 793 726 | 11/2000 |
| GB | 2 324 065 | 10/1998 |

* cited by examiner

*Primary Examiner*—B. Shewareged
(74) *Attorney, Agent, or Firm*—Westerman, Hattori, Daniels & Adrian LLP

(57) ABSTRACT

The present invention relates to a self-adhesive or thermally bondable security document that can be affixed to an article, characterized in that it comprises at least one medium capable of receiving print on the front side, said medium having, on its reverse side, at least one self-adhesive or thermally adhesive layer and at least one marker that emits a characteristic signal by itself, such that, after the document has been bonded by means of said adhesive layer to the article, in the event of disbandment of the document at least part of said marker detaches from the medium. The invention also relates to a method of authenticating the article.

45 Claims, 1 Drawing Sheet

SECURITY DOCUMENT WITH MARKER

The present invention relates to the field of self-adhesive or thermally bondable documents and more particularly to a security document such as a visa intended to be bonded to one page of a passport.

At the present time, self-adhesive or thermally bondable visas are produced from a paper of low grammage coated with an adhesive and when attempts are made to disbond the visa, this results in delamination of the passport paper on which the visa was affixed or in tearing of the visa paper itself.

However, it turns out that forgers can nevertheless remove the visa from the passport and then reuse it. A first way in which counterfeiters achieve this consists in mechanically disbonding the visa without tearing it, by delaminating the passport paper only depthwise and then abrading the coated reverse side of the visa so as to remove the particles of paper from the passport that have remained attached to the latter. A second way consists in recovering the visa by heating the adhesive, in order to soften it in such a way that the visa separates entirely from the substrate. Another way consists in disbonding the visa chemically, by dissolving the adhesive using solvents, especially apolar solvents such as, for example, white spirit, petrol A, kerosene, paraffin, Eau écarlate®, Zippo® lighter fuel, oil of turpentine, trichloroethylene, heptane, hexane, Un Du®, a universal synthetic diluent.

The object of the present invention is especially to improve the security of self-adhesive or thermally bondable documents, in particular visas, and articles incorporating them, such as passports. The object is more particularly to prevent the fraudulent reuse of these documents once they have been disbonded from the authentic article.

The object of the invention is achieved by providing a self-adhesive or thermally bondable security document (V) that can be affixed to an article (P), which is characterized in that it comprises at least one medium (1) capable of receiving print on the front side, said medium having, on its reverse side, at least one self-adhesive or thermally adhesive layer and at least one marker (3) that emits a signal which is characteristic per se, such that, after the document (V) has been bonded by means of said layer of adhesive to the article (P), in the event of disbondment of the document (V) at least part of said marker (3) detaches from the medium (1).

In particular, the document is such that, after it has been bonded, should it be disbanded at least part of said marker (3) remains attached to said article (P).

If the document is disbonded for the purpose of being fraudulently reused on another article, when said article is being checked according to the signal being emitted by the marker, this response will be different, or even absent, compared with that normally given by an article provided officially with said authentic document. The fraudulent reuse of the document will thus be exposed.

More particularly, at least part of said marker (3) is contained in a layer, this said layer being such that, after bonding the document (V) on the article (P), in the event of disbondment of the document (V) at least part of said layer with said marker (3) remains attached to said article (P).

According to one particular case, said layer containing this part of the marker (3) is the adhesive layer.

The term "layer" is understood to mean several types of layer—it may be a single layer or a multilayer, and it may also be continuous or discontinuous. Preferably, the layer extends over the entire surface of the document to be affixed, even when it is discontinuous. It may be continuous because it consists of a uniform layer, but also because it is composed of contiguous features, especially in the form of bands. It is discontinuous because it is formed from noncontiguous features.

In general, the features may be in a geometrical shape, especially dots, lines or bands, or in the form of alphanumeric characters. They may have a verbal or nonverbal meaning or may constitute a code, especially a barcode, it being possible for the code also to be due to the marker.

In one particular embodiment, the layer is a monolayer comprising a single type of adhesive or several types of adhesive. This layer may be formed from several regions having particular adhesion properties.

According to one particular embodiment of the invention, the layer including at least part of said marker (3) is a monolayer having, in the same plane, several bands of different adhesivities and at least one of said bands includes at least one part of said marker (3) such that, after the document (V) has been bonded to the article (P), in the event of disbandment of the document (V) at least part of the band including said marker (3) remains attached to said article (P).

According to another particular embodiment, the layer is a multilayer made from several adhesive layers comprising several types of adhesives. These adhesives are deposited in an adjacent manner, especially contiguous or superposed on each other or in noncontiguous features.

According to another particular embodiment of the invention, the document (V) is characterized in that said medium (1) comprises, on its reverse side, several layers deposited on top of one another and having different adhesivity properties, one of the layers including at least part of said marker (3), such that, after the document (V) has been bonded to the article (P), in the event of disbandment of the document (V) at least part of the layer including said marker (3) remains attached to said article (P).

The layer can thus be a multilayer made from several adhesive layers including one or more types of adhesive.

According to one particular embodiment of the invention, the document (V) is characterized in that said medium (1) has, on its reverse side, at least one layer having reduced adhesivity properties allowing disbandment of the layer with the marker, such that in the event of disbondment of the document (V) at least part of said layer with said marker (3) remains attached to said article (P).

According to one particular embodiment of the invention, said layer containing the marker includes one or more regions having particular adhesion properties.

Said regions having particular adhesion properties in the case of a monolayer or a multilayer may take the form of separate features, especially points, lines, bands or alphanumeric characters, or the form of a uniform layer entirely covering the adhesive layer(s); they make it possible to obtain the desired total or nonuniform disbandment desired between said document and the article. These regions may have properties that reduce the adhesion between the adhesive and either the document or the article to which the document is affixed. Conversely, they may have properties that increase the adhesion between the adhesive and either the document or the article to which the document is affixed. These regions may be a combination of regions having properties that decrease the adhesion and properties that increase the adhesion, respectively.

The properties that decrease the adhesion may stem from the application of a product such as an adhesion inhibitor or of a product having controlled nonstick properties, especially a silicone. It may especially be a silicone layer of low coating weight, of around 2 $g/m^2$.

The adhesion may be increased by applying, for example, an adhesion catalyst. According to one particular embodiment of the invention, the document (V) is characterized in that the layer containing at least part of the marker (3) includes a single type of adhesive within which the marker (3) is distributed, in different concentrations in defined patterns, especially in the form of adjacent bands, and in that it has regions (2*a*, 2*b*) having particular adhesion properties, possibly coinciding with the features of a given concentration, in such a way that, in the event of disbandment of the document (V), one region (2*a*, 2*b*) remains bonded almost entirely to the medium (1) of said document (V) whereas another region (2*a*, 2*b*) remains bonded almost entirely to the article (P).

According to one particular embodiment of the invention, the document (V) is characterized in that at least part of the marker (3) lies within a layer having a controlled melting point, especially above 50° C., preferably equal to about 60–65° C., and such that, should there be an attempt at thermal disbandment, said layer results in the creep of at least part of said marker toward the layer(s) that will remain at least partly attached to the article (P), in particular the layer of adhesive. Such a controlled-melting layer may be a thin layer formed from a silicone emulsion.

The term “medium” is understood to mean any type of relatively thin and flexible substrate capable of acting as a support for printing/writing, and therefore especially such as a visa or else a label intended to guarantee the authenticity of an article. The medium may more particularly be a paper based on cellulose fibers and/or synthetic fibers or else a plastic film, such as especially a coated polyethylene film sold under the brand name POLYART® by Arjobex. It is also possible to use a document that either has a relatively high grammage, in particular formed from several plies, especially two plies. Moreover, this substrate may contain known security elements.

According to one particular embodiment of the invention, the medium of said document is a substrate having weakened regions, especially from the fact that there is internal cohesion reduced by scoring at mid-body, by watermarking and/or by the introduction of components that reduce its cohesion, such as, for example, mineral fillers for a cellulose paper. In the case of a multi-ply, especially two-ply, medium, the cohesion of the plies may be decreased by applying a specific composition. In the case of a multi-ply, in particular two-ply, paper, and especially when the plies are assembled when wet, their cohesion may be reduced by applying a composition between the plies before they are assembled. In particular, this composition is based on a compound chosen from polyurethanes used in the form of an aqueous dispersion and styrene-butadiene copolymers, especially those that have been carboxylated, used in aqueous dispersion form.

The medium may also be weakened along its edges by cutting into lacing or sawteeth or a comb, by microperforations. Thus, when the document is disbonded, the probability of it initiating a tear is increased.

The medium may be transparent so as to be able to see underlying features stemming from the layer of adhesive or made on the article to which it is affixed.

According to one particular embodiment of the invention, the document (V) is characterized in that the medium is a paper having at least one region of reduced opacity, or even a transparent region, allowing the signal from said marker to be detected, especially by visual observation.

In one particular embodiment of the invention, the document (V) is characterized in that the medium is a paper having at least one region of reduced thickness, or even zero thickness.

Such media have been described in patent application WO 94/20679.

In one particular embodiment, the substrate may contain, in the bulk or on the surface, components that react with apolar solvents that could be used to falsify said substrate; in addition, it may include, between its surface and said layer of adhesive, a layer that acts as a barrier to the apolar solvents, especially between its surface and a layer of adhesive. This barrier layer prevents the layer of adhesive, including the regions of variable adhesion that might contain apolar components, from reacting over the course of time with the reactive agents in the paper. In particular, such a barrier layer includes a compound chosen from polyvinyl alcohols, especially a polyvinyl alcohol having a very high film-forming capability, a high molecular weight and a high degree of hydrolysis, especially one greater than or equal to 98%, optionally a carboxylated polyvinyl alcohol, acrylic-based polymers, nitrile-based polymers, a styrene-acrylic copolymer, a polyvinyl chloride, a fluorinated resin, starches, and mixtures thereof. In particular, it is possible to use a mixture of a water-soluble polymer, such as polyvinyl alcohol or starch, with the abovementioned other polymers used in aqueous dispersion form.

The components that react with the apolar solvents are solid particles insoluble in water and soluble in apolar solvents, which particles create, when attempts at falsification are made using these solvents, colored stains visible to the naked eye or under ultraviolet light.

In one particular embodiment of the invention, the document (V) is characterized in that said barrier layer has a controlled melting point, in particular above 50° C., and preferably equal to about 60–65° C., and such that, in the event of an attempt at thermal disbondment, said layer results in the creep of the marker toward the layer(s) which will remain at least partly attached to the article (P), in particular the layer of adhesive.

In nonlimiting particular embodiments, the medium of the self-adhesive or thermally bondable document may have a thickness of between 20 and 70 μm and a grammage of between 50 and 80 $g/m^2$. The standard grammage of a paper medium for a visa is about 65 $g/m^2$.

Preferably, at least part of the article, to which the document will be affixed, also contains at least one marker that emits a signal which combines with the signal from the marker of said self-adhesive or thermally bondable document.

Preferably, the marker is chosen from particles that can be detected by magnetic resonance, magnetic particles that can be detected by a magnetoresistive head, especially particles of magnetic materials having a medium to high coercitivity, particles that can be excited at given wavelengths, biotechnologically detectable elements and mixtures thereof. This may be the marker in said self-adhesive or thermally bondable document and also, possibly, the marker in the other part of the article.

The particles detectable by magnetic resonance are those that can be detected, for example, by nuclear magnetic resonance (NMR), by low-field electron spin resonance or by nuclear quadripole resonance, such as resonance in the absence of an external static field as described in U.S. Pat. No. 5,986,550 which gives a detailed description of the various types of resonance. Particles suitable for the invention are also described in patent WO 96/05522 filed by Micro-Tag Temed Ltd.

Magnetic materials of medium to high coercitivity have the advantage of not being easily demagnetizable and therefore of permanently ensuring that there is detectable magnetism. Medium-coercitivity materials have a coercitivity of between $32\times10^3$ and $135\times10^3$ A/m; the most common ones are cobalt-doped iron oxides or chromium dioxides. High-coercitivity magnetic materials have a coercitivity of between $135\times10^3$ and $800\times10^3$ A/m; the most common ones are barium or strontium ferrites.

Particles that can be excited at given wavelengths are especially infrared-excitable particles, particularly in the case of near infrared, or UV-excitable particles. They may especially be fluorescent particles.

In one particular embodiment, the adhesive of said document includes fluorescent particles that emit fluorescence at a wavelength, which combines with that emitted by fluorescent particles contained in the article to which said document will be affixed. Thus, what will be observed is a color that corresponds to the combination of the two colors. For example, the particles in the document emit in the blue and those in the article in the red; when the document has been affixed to the article, a violet color is observed.

Advantageously, the document includes one or more types of fluorescent particles that possibly emit at different wavelengths and combine to emit light at a given wavelength and, moreover, the article also includes one or more types of fluorescent particles that possibly emit at different wavelengths and combine to emit light at a given wavelength, the resultant of all these emissions giving white light.

For example, the document contains two types of particles, one emitting in the yellow and the other in the blue, so that the observed color is green, while the article contains particles that emit in the red, the resultant then giving white light. In the case of an article with a completely legal document, no emission of light is observed at one or more distinctive wavelengths, whereas if the document is a reused document, a uniform white color will not be observed, rather colored light will be emitted at the places where particles are missing.

The fluorescent particles may also be chosen so as to form a light cascade.

In one particular embodiment of the invention, the marker is encapsulated in the adhesive, for example using matrix methods (gelatin beads) or membrane methods (liposomes) or by molecular methods (cyclodextrines). The encapsulating may allow the markers to be protected. In certain cases, provision may be made for the capsules to be able to be broken when the document is fraudulently disbonded and for a marker product to be released that reacts with another marker already present in the adhesive, for example forming an indelible coloration on the article.

In one particular embodiment of the invention, the self-adhesive or thermally bondable document is such that said adhesive layer is a monolayer comprising a single type of adhesive within which the marker in the form of particles is uniformly distributed and such that the cohesive strength of said adhesive layer, after the document has been bonded to the article, makes it possible, in the event of disbandment, for said layer to physically separate, one part remaining on the medium of said document and the other part on the article.

In one particular embodiment of the invention, the self-adhesive or thermally bondable document is such that said adhesive layer is a multilayer and comprises two adhesive monolayers each including a marker, these monolayers being separated by a layer having controlled nonstick properties so that, after the document has been bonded to the article, in the event of disbondment, said multilayer separates at the nonstick layer, leaving one of the adhesive monolayers on the medium of said document and the other monolayer on the article. The adhesives of the layers may be the same or different. The nonstick layer may be a silicone layer deposited in an amount of 2 $g/m^2$.

In one particular embodiment of the invention, the self-adhesive or thermally bondable document is such that the adhesive layer comprises a single type of adhesive within which the marker is distributed, preferably in different concentrations in defined patterns, especially in the form of adjacent bands, and such that it has regions having different adhesion properties, possibly coinciding with the features of a given concentration, in such a way that, in the event of disbandment of the document, one region remains bonded almost entirely to the medium of said document whereas another region remains bonded almost entirely to the article.

More particularly, the self-adhesive or thermally bondable document is such that said regions each have one of their dimensions equal to one of the sides of said document, once it has been cut to the size and shape suitable for the article to be protected.

In one particular version of this embodiment, the adhesive layer has a region, lying between said adhesive and the medium, which includes an agent that reduces its adhesivity, this region forming a region that will remain bonded virtually entirely to the article in the event of disbondment of the document.

Alternatively, said adhesive layer has a region, lying between said adhesive layer and the article, which includes an agent that reduces its adhesivity, this region forming a region that will remain bonded virtually entirely to the medium of said document in the event of disbondment of the document.

Alternatively, the regions having different adhesive properties are not created by regions having controlled nonstick properties but by regions having adhesive properties enhanced by a specific agent, the combination of the two being possible.

In another particular embodiment of the invention, the self-adhesive or thermally bondable document is such that the adhesive layer comprises at least two types of adhesive having different adhesive properties, each adhesive forming the features that will remain bonded virtually entirely to the medium of said document and the features that will remain bonded virtually entirely to the article, respectively. Preferably, various types of adhesive include the same marker, but in different concentrations. Alternatively, they include different markers, especially markers that are detectable by different techniques. For example, one may contain UV-detectable particles and the other IR-detectable particles. The detection device may be a system that emits both these types of illumination (at different wavelengths).

In one particular embodiment of the invention, the base is a two-ply paper base that includes an adhesion-reducing composition between the plies. For example, the paper base is produced on a two-ply machine and is formed from two plies of about 40 $g/m^2$ not having the same composition—a marker in the lower ply will remain on the adhesive side during any attempt to peel the document off.

While the two plies are being assembled to form the two-ply paper base, a compound is sprayed, in an amount of about 5 $g/m^2$ by dry weight, between the two wet plies so as to create a weakness in terms of adhesion between the two plies. This compound is especially chosen from a polyurethane in emulsion form, such as that sold under the name SOLUCOTE 95 181 3 35 by Soluol or a styrene-butadiene copolymer, in particular a carboxylated styrene-butadiene copolymer sold under the name RHODOPAS PE1358 by Latexia.

The base paper thus obtained is then coated with a pressure-sensitive adhesive on the reverse side of the lower ply, this adhesive being selected in such a way that the adhesive strength between the lower ply and the substrate to which the visa will be applied is greater than the adhesive strength between the two plies of the base during an attempt at disbondment by the forger.

To provide very good protection against falsification by disbondment using a combination of mechanical, chemical and thermal means, it is possible to provide, in one particular embodiment of the invention, a document formed from a medium made of a reactive paper, that reacts to apolar solvents, this paper being covered with a layer having nonstick properties which is itself covered with an adhesive layer containing a marker, the nonstick layer having a controlled melting point. During any attempt at disbondment by mechanical or solvent means at room temperature, the document separates at the nonstick layer and the adhesive part with the marker remains on the article; moreover, the document will have colored stains upon reaction with the solvents and, if the attempt also includes the application of heat, the nonstick layer will at least partly flow into the adhesive, and the document will be removed, leaving the adhesive, the marker and some of the nonstick layer. The nonstick layer may be formed from a silicone emulsion. In another particular embodiment of this multiprotection system, a document may be provided that is formed from a paper that reacts to apolar solvents and is covered with a solvent barrier layer, as described above, said barrier layer itself being covered with a layer of adhesive containing a marker 2 having controlled adhesion for peeling at room temperature, said layer itself being covered with a layer having a low melting point, itself covered by another layer of adhesive with a marker 1. The solvent-barrier layer prevents apolar compounds in the adhesive layer with the marker 2 from staining the paper over the course of time. The layer having a low melting point migrates at least partly into the adhesive with the marker 1 in the event of thermal disbondment; the document separates from the article at this point, the paper becomes stained in the event of solvent disbandment and in the event of mechanical disbandment, the document separates from the article at the controlled adhesion layer.

According to another particular embodiment of this multiprotection system, it is possible to provide a document that is formed from a medium made of a paper reactive to apolar solvents and covered with a solvent-barrier layer as described above, said barrier layer being covered with a layer of adhesive containing a marker 1, for example a red fluorescent compound (exhibiting controlled adhesion for peeling at room temperature), itself covered with a layer of another adhesive containing a marker 2, for example a yellow fluorescent compound. The document thus exhibits a specific fluorescence along the edge. Irreversible thermochromic printing is applied to the other face of the medium, said printing coloring or assuming another tint irreversibly when heat is applied during an attempt at thermal disbandment. During an attempt at solvent disbandment, the paper becomes stained. During an attempt at mechanical disbondment, the document separates from the article at the adhesive layers, the layer with the marker 2 remaining on the article; when the disbanded document is reaffixed to another article, only the red fluorescence will be observed.

The adhesive layer is deposited by known surface treatment or coating means, such as gravure coating, roll coating operating in the reverse direction, called reverse-roll coating, and screen printing. When adhesives having different adhesive properties are used, two different compositions are produced and deposited in a registered manner on the medium of the document, possibly in several passes, advantageously by a gravure coater, allowing regions to be produced with different adhesives. The adhesives used are formulated in aqueous medium and/or in solvent medium and/or with a UV-crosslinkable base. In particular, acrylic adhesives or acrylates formulated in aqueous medium may be used.

The self-adhesive or thermally bondable document may include a removable protective film, such as a siliconized nonstick film, on the adhesive layer, allowing it to be handled.

The invention also relates to a visa obtained from said self-adhesive or thermally bondable document and to a passport that includes a page covered with such a visa.

The invention also relates to a method of authenticating a security article, especially a passport, which includes a page covered by the bonding of said self-adhesive or thermally bondable document, which is characterized in that the signal emitted by the page/document combination is detected and in that the signal is compared, visually or by means of suitable algorithms, with that prerecorded and emitted by an authentic page/document combination.

The invention will be better understood with the aid of the examples together with the figures described below. In the figures, the relative proportions between the various constituent elements have not been drawn to scale so as to make the drawing clearer.

The self-adhesive document (V) was produced in the following manner: Consider the medium (1), this being a sheet of paper normally used to make a visa, made from cellulose fibers and including reactive components, for identifying any falsification by chemical means, and having a weight of 65 $g/m^2$. Deposited in an amount of 20 $g/m^2$ by dry weight on a siliconized glassine film, by reverse-roll coating, was an adhesive composition (2) comprising a single type of acrylic-based adhesive and magnetic barium ferrite particles, constituting the marker (3), which were uniformly dispersed within the adhesive. The sheet (1) was joined to the coated film on the adhesive-coated side. The self-adhesive film-coated document (V) obtained was cut to the appropriate shape after it was printed and personalized, with the personal details of the recipient or the country of the visa. During printing or personalization, the magnetic particles were magnetized using a magnetic field generated by an inductive head or by a magnet or by a coil. The siliconized film was removed, allowing the adhesive with the marker to be transferred onto the self-adhesive document (V) and then this document was bonded to one page of a passport (P) as shown in FIG. 1.

Figure 2:
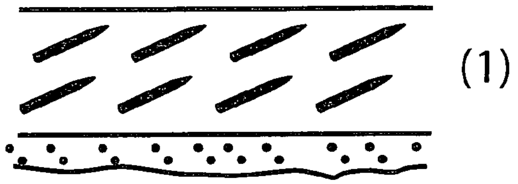
FIG. 2 is a view of the document after it has been disbanded from the article (P) to which it was affixed.

The cohesive strength of said adhesive layer, after the document has been bonded to a passport page, makes it possible, in the event of disbondment, for said layer to separate physically, with one part remaining on the medium (1) of said document and the other part on the passport page, as shown in FIG. 2.

Figure 1:
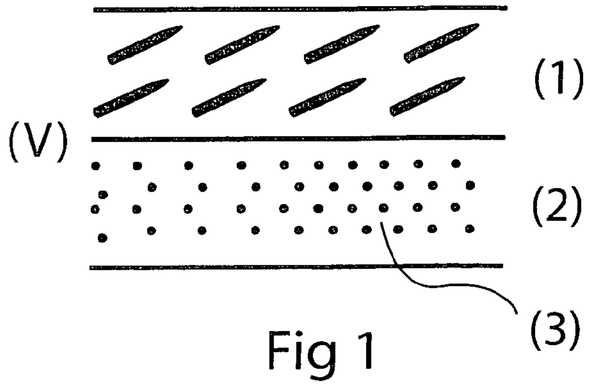
FIG. 1 is a cross-sectional view of a self-adhesive document (V) according to one particular embodiment of the invention.
Figure 3:
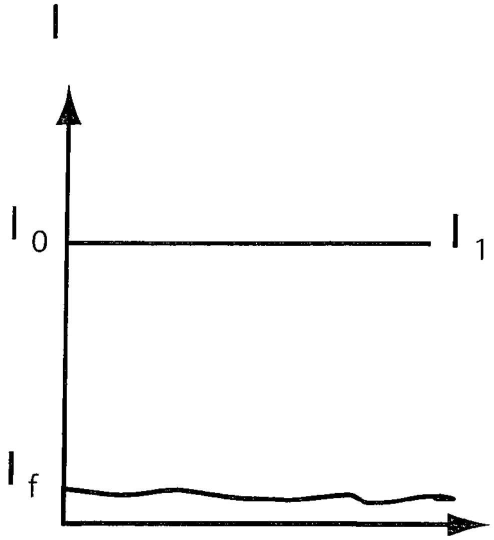

FIG. 3 describes the comparison between:

the amplitude $I_0$ of the signal from the document (V), detected by passing the film-coated self-adhesive document through a detector having a magnetoresistive head, the amplitude $I_1$ of the signal from the document (V) once it has been affixed normally to an article (P) as shown in FIG. 1, detected by passing the passport page coated with the self-adhesive document through the detector with a magnetoresistive head, $I_1$ being equal to and superposable on $I_0$, and the amplitude $I_f$ of the signal from the document (V) after it has been disbanded, as shown in FIG. 2, and fraudulently reaffixed to another article, the amplitude If being less than $I_0$ since marker particles have remained on the original article (P).

Figure 4:
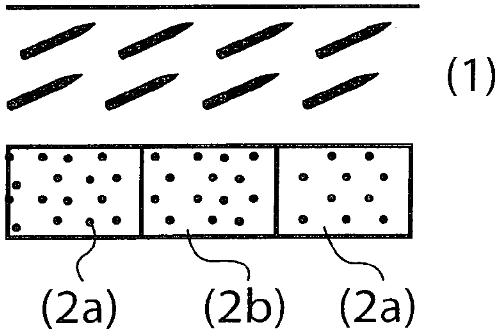

FIG. 4 is a cross-sectional view of a self-adhesive document (V) according to one embodiment of the invention with adhesive regions (2*a*) and (2*b*) that have different adhesive properties with respect to the medium (1) of said document (V) and to the article (P).

Figure 5:
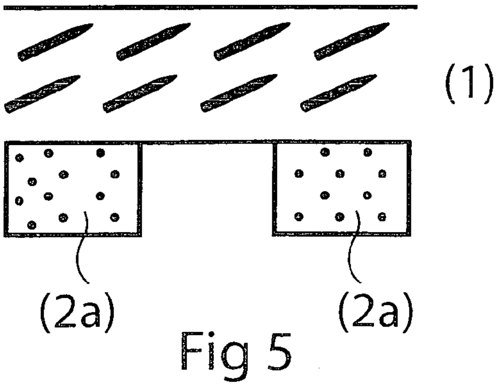

FIG. 5 is a view of the document after it has been disbonded from the article (P) to which it was affixed; the regions (2*a*) have remained entirely bonded to the medium of the document and the regions (2*b*) have remained entirely bonded to the article.

The self-adhesive document (V) as shown in FIG. 4 was produced in the following manner: deposited on a medium, consisting of a sheet of paper normally used to make a visa, made from cellulose fibers and including components that are reactive to falsification, and with a weight of 65 g/m$^2$, in an amount of 20 g/m$^2$ by dry weight, by gravure coating, was an adhesive composition (A1) comprising a first type of adhesive within which barium ferrite magnetic particles constituting the marker were uniformly dispersed, this adhesive composition being deposited in a pattern forming two regions (2*a*) in the form of a band, one of the dimensions of which was the width of that of the self-adhesive document, after it was cut to the appropriate size in order to be affixed to a passport page, the two bands being separated by a band left blank, and then deposited at the band corresponding to the band left blank, forming the region (2*b*), was another adhesive composition (A2) comprising a second type of adhesive within which barium ferrite magnetic particles were uniformly dispersed, said composition (A2) having the same concentration as the composition (A1). The sheet obtained was dried. The self-adhesive document obtained was covered with a siliconized protective film on its adhesive face.

The document was then printed and personalized, during which the magnetic particles were magnetized using a magnetic field generated by an inductive head or by a magnet or by a coil. The self-adhesive document (V) obtained after cutting to the appropriate size was bonded to one page of a passport (P) as shown in FIG. 4. The two types of adhesive had different adhesive properties allowing the regions (2*a*) to remain bonded virtually entirely to the medium (1) of the document while allowing the region (2*b*) to remain bonded virtually entirely to the passport page after the document has been disbonded.

Figure 6:
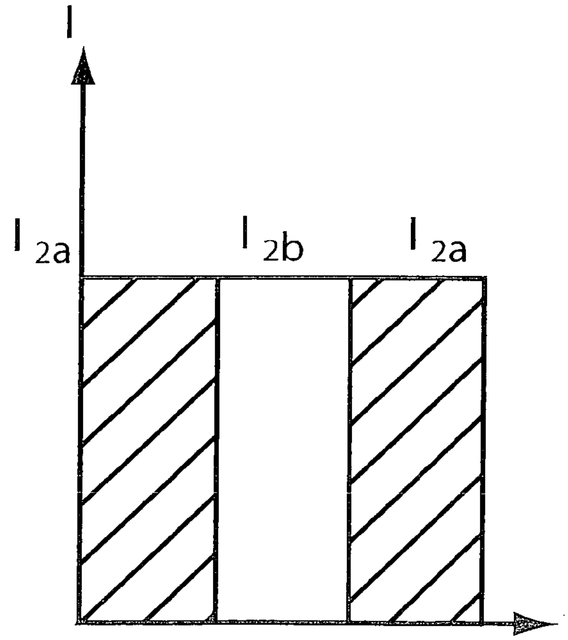

FIG. 6 describes the comparison between:

the amplitudes $I_{2a}$ and $I_{2b}$ of the signal from the self-adhesive document (V), detected by making the document covered with a protective film on the adhesive pass through a detector having a magnetoresistive head, these amplitudes being equal in the particular case of the example as the particles of the marker at the same concentrations in (2*a*) and (2*b*);

the amplitudes $I_{2a}$ and $I_{2b}$ of the signal from the document (V) once it has been normally affixed to one page of a passport—the article (P)—as shown in FIG. 4; these amplitudes are equal and can be superimposed on those of the document by itself;

the detected signal from the self-adhesive document disbonded as shown in FIG. 5 and fraudulently reaffixed to another passport page; the amplitude of the signal includes practically zero parts since the particles in the region (2*b*) have remained on the page of the original passport (P), the signal being unable to be superimposed on that from the original self-adhesive document (P).

Another example using microparticles detectable by magnetic resonance as marker was as follows.

On a medium consisting of a sheet of paper normally used to make a visa, made from cellulose fibers and including components that are reactive to falsification, and with a weight of 65 g/m$^2$, a nonstick composition was deposited on the medium and then deposited in an amount of 20 g/m$^2$ by dry weight, by gravure coating, was an adhesive composition comprising an adhesive within which microparticles detectable by magnetic resonance (sold by Micro-Tag Temed Ltd), constituting the marker, were uniformly dispersed, this adhesive composition being deposited in a pattern forming three regions in the form of bands, one of the dimensions of which was the width of that of the self-adhesive document after it was cut to the appropriate size in order to be affixed to a passport page, the bands being separated by a band left blank. The adhesive composition contains 3% of the marker by dry weight.

The sheet obtained was dried and the self-adhesive document obtained was covered with a siliconized protective film on its adhesive face.

The film-coated self-adhesive document obtained was cut to the suitable size after being printed and personalized with the personal details of the recipient or the country of the visa. The siliconized film was removed and then this document was bonded to one page of a passport.

The marker was detectable by a portable magnetic resonance detector developed by Motorola, three signals corresponding to the marked bands being observed.

If the document were to be disbonded from the page of the passport, the marked bands would remain on the passport, and thus if a forger were to reaffix the disbonded document onto another passport there would no longer be any signal.

The invention claimed is:

1. A self-adhesive or thermally bondable security document (V) comprising:

at least one medium having a front side capable of receiving print, at least one self-adhesive or thermally adhesive layer disposed on a reverse side of said medium, said adhesive layer having a front surface and an adhesive back surface such that said medium is capable of being affixed to an article (P), and at least one marker that emits a signal which is characteristic per se, said marker being contained in a layer selected from the group consisting of (i) the adhesive layer and (ii) another layer intermediate between the adhesive layer and the front side of the medium, wherein said marker is chosen from particles that can be detected by magnetic resonance, magnetic particles that can be detected by a magnetoresistive head, particles that can be excited at given wavelengths to emit fluorescence, UV-detectable particles, IR-detectable particles, particles that can be detected by biotechnological method, and mixtures thereof, such that, after the document (V) has been bonded by means of said adhesive layer to the article (P), in the event of disbondment of the document (V), at least a portion of the adhesive layer and at least part of said marker detaches from the medium.

2. The document as claimed in claim 1, wherein it is such that, after bonding the document (V), in the event of disbondment of the document (V), said at least part of said marker remains attached to said article (P).

3. The document as claimed in claim 1, wherein said layer being said layer containing said marker is such that, after the document (V) has been bonded to the article (P), in the event of disbondment of the document (V) at least part of said layer with said at least part of said marker remains attached to said article (P).

4. The document (V) as claimed in claim 3, wherein said layer is the adhesive layer.

5. The document as claimed in claim 3, wherein said layer is a monolayer having, in the same plane, several bands of different adhesivities and in that at least one of said bands includes at least one part of said marker such that, after the document (V) has been bonded to the article (P), in the event of disbondment of the document (V) at least part of the band including said marker remains attached to said article (P).

6. The document (V) as claimed in claim 3, wherein said medium comprises, on its reverse side, several layers deposited on top of one another and having different adhesivity properties, one of the layers including at least part of said marker, such that, after the document (V) has been bonded to the article (P), in the event of disbondment of the document (V) at least part of the layer including said marker remains attached to said article (P).

7. The document as claimed in claim 6, wherein said layers include one or more types of adhesive.

8. The document as claimed in one claim 3, wherein said layer has reduced adhesivity properties allowing disbondment of the layer with the marker, such that in the event of disbondment of the document (V) at least part of said layer with said at least part of said marker remains attached to said article (P).

9. The document (V) as claimed in claim 1, wherein said layer containing the marker includes one or more regions (2*a*, 2*b*) having particular adhesion properties.

10. The document (V) as claimed in claim 9, wherein said regions take the form of separate features, or the form of a uniform layer entirely covering the adhesive layer(s).

11. The document (V) as claimed in claim 3, wherein said layer includes a single type of adhesive within which the marker is distributed, in different concentrations in defined patterns, and in that it has regions having particular adhesion properties, in such a way that, in the event of disbondment of the document (V), one region remains bonded almost entirely to the medium of said document (V) whereas another region remains bonded almost entirely to the article (P).

12. The document (V) as claimed in claim 9, wherein said regions have properties that reduce the adhesion between the adhesive and either the document (V) or the article (P) to which the document (V) is affixed.

13. The document (V) as claimed in claim 9, wherein said regions have properties that increase the adhesion between the adhesive and either the document (V) or the article (P) to which the document (V) is affixed.

14. The document (V) as claimed in claim 9, wherein said regions are a combination of regions having properties that decrease the adhesion and properties that increase the adhesion, respectively.

15. The document (V) as claimed in claim 1, wherein at least part of the marker lies within a layer having a controlled melting point, and such that, should there be an attempt at thermal disbondment, said layer results in the creep of at least part of said marker toward the layer(s) that will remain at least partly attached to the article (P).

16. The document (V) as claimed in claim 1, wherein the medium is a substrate having weakened regions.

17. The document (V) as claimed in claim 1, wherein the medium is a multi-ply paper having an adhesion-reducing composition between at least two of these plies.

18. The document (V) as claimed in claim 17, wherein said composition is based on a compound chosen from polyurethanes used in the form of an aqueous dispersion and styrene-butadiene copolymers used in aqueous dispersion form.

19. The document (V) as claimed in claim 1, wherein the medium includes components that react with apolar solvents.

20. The document (V) as claimed in claim 19, wherein it includes a layer acting as barrier to the apolar solvents.

21. The document (V) as claimed in claim 20, wherein said barrier layer has reduced adhesivity properties allowing detachment of the marker with the medium in the event of disbondment of the document (V).

22. The document (V) as claimed in claim 20, wherein said barrier layer has a controlled melting point, and such that, in the event of an attempt at thermal disbondment, said layer results in the creep of the marker toward the layer(s) which will remain at least partly attached to the article (P), in particular the layer of adhesive.

23. An article (P) to which the document (V) as claimed in claim 1, is affixed, wherein the article (P) also contains at least one marker that emits a signal which is combined with the signal from the marker of said document (V).

24. The document (V) as claimed in claim 1, wherein said marker is chosen from particles that can be detected by magnetic resonance, magnetic particles that can be detected by a magnetoresistive head, particles that can be excited at given wavelengths, and mixtures thereof.

25. The article (P) as claimed in claim 23, wherein said marker of said document (V) comprises fluorescent particles that emit fluorescence at one wavelength which combines with that emitted by fluorescent particles contained in the article (P) to which said document (V) will be affixed.

26. The article (P) as claimed in claim 23, wherein the document (V) includes, as marker, one or more types of fluorescent particles and combine to emit light at a given wavelength and in that, moreover, the article (P) also includes one or more types of fluorescent particles that possibly emit at different wavelengths and combine to emit light at a given wavelength, the resultant of all these emissions giving white light.

27. The document (V) as claimed in claim 1, wherein the medium is a paper having at least one region of reduced opacity, or even a transparent region, allowing the signal from said marker to be detected, especially by visual observation.

28. The document (V) as claimed in claim 1, wherein the medium is a paper having at least one region of reduced thickness.

29. A visa obtained from a self-adhesive or thermally bondable document (V) as claimed in claim 1.

30. A passport (P) having a page covered with a bonded visa as claimed in claim 29.

31. A method of authenticating a security article, having a page that includes a marker and is covered by the bonding of a self-adhesive or thermally bondable document (V) as claimed in claim 1, comprising:

detecting the signal emitted by the page/document combination, and comparing the signal, visually or by means of suitable algorithms, with that prerecorded and emitted by an authentic page/document combination.

32. The method as claimed in claim 31, wherein the bondable document (V) is a visa.

33. The method as claimed in claim 32, wherein the security article is a passport.

34. The document (V) as claimed in claim 10, wherein the separate features include features selected from the group consisting of points, lines, bands, and alphanumeric characters.

35. The document (V) as claimed in claim 11, wherein the patterns include adjacent bands.

36. The document (V) as claimed in claim 15, wherein the controlled melting point is above 50° C.

37. The document (V) as claimed in claim 36, wherein the controlled metling point is in the range of about 60–65° C.

38. The document (V) as claimed in claim 15, wherein said at least part of said marker migrates toward the part of the adhesive layer that will remain at least partly attached to the article (P).

39. The document (V) as claimed in claim 16, wherein the weakened regions result from the fact that there is internal cohesion reduced by scoring at mid-body, by watermarking and/or by the introduction of components that reduce its cohesion and/or especially from the fact that its edges have been weakened by cutting them into lacing, sawteeth or a comb, and/or by microperforations.

40. The document (V) as claimed in claim 22, wherein the controlled melting point is above 50° C.

41. The document (V) as claimed in claim 40, wherein the controlled melting point is in the range of about 60–65° C.

42. The document (V) as claimed in claim 24, wherein said marker is chosen from particles of magnetic materials having a medium to high coercitivity.

43. The document (V) as claimed in claim 28, wherein the medium is a paper having at least one region of zero thickness.

44. The document (V) as claimed in claim 1, wherein the particles are magnetic particles.

45. The document (V) as claimed in claim 1, wherein the particles emit fluorescence.

* * * * *